United States Patent
Choi

(10) Patent No.: US 8,870,379 B2
(45) Date of Patent: Oct. 28, 2014

(54) 3D IMAGE CONVERTIBLE PROJECTION OPTICAL SYSTEM

(76) Inventor: Hae-Yong Choi, Seoul (KR)

( * ) Notice: Subject to any disclaimer, the term of this patent is extended or adjusted under 35 U.S.C. 154(b) by 344 days.

(21) Appl. No.: 13/304,977

(22) Filed: Nov. 28, 2011

(65) Prior Publication Data

US 2012/0133893 A1    May 31, 2012

(30) Foreign Application Priority Data

Nov. 29, 2010 (KR) .................. 10-2010-0119477

(51) Int. Cl.
*G03B 21/00* (2006.01)
*G03B 21/20* (2006.01)
*G02B 27/22* (2006.01)
*G03B 35/26* (2006.01)
*H04N 13/04* (2006.01)

(52) U.S. Cl.
CPC ............ *G03B 35/26* (2013.01); *H04N 13/0434* (2013.01); *H04N 13/0459* (2013.01)
USPC ................................ 353/7; 353/102; 359/466

(58) Field of Classification Search
CPC ........ G03B 35/26; G03B 35/22; G03B 35/24; G02B 27/26; G02B 27/24; G02B 27/2235; G02B 27/2242; H04N 13/0434; H04N 13/0459; H04N 13/04; H04N 13/0436
USPC .............. 353/7, 8, 10, 99, 102; 359/376, 377, 359/378, 465, 466, 471; 348/51, 57, 58, 42; 352/58, 60
See application file for complete search history.

(56) References Cited

U.S. PATENT DOCUMENTS

| | | | | |
|---|---|---|---|---|
| 2,063,004 A | * | 12/1936 | Louisot | 359/459 |
| 2,314,174 A | * | 3/1943 | Steinman | 396/331 |
| 4,555,168 A | * | 11/1985 | Meier et al. | 353/7 |
| 4,596,451 A | * | 6/1986 | Marks | 352/60 |
| 5,835,132 A | * | 11/1998 | Okino et al. | 348/42 |
| 2010/0141856 A1 | * | 6/2010 | Schuck et al. | 349/9 |
| 2010/0195006 A1 | * | 8/2010 | Iwai et al. | 349/9 |
| 2011/0096295 A1 | * | 4/2011 | Cowan et al. | 353/8 |

* cited by examiner

*Primary Examiner* — William C Dowling
*Assistant Examiner* — Ryan Howard
(74) *Attorney, Agent, or Firm* — Bacon & Thomas, PLLC

(57) ABSTRACT

A 3D image convertible projection system for viewing an image broadcasted as a 3D image or an image from a 3D DVD, etc., using a general projector in which a general projector receives a left-eye image and a right-eye image for the 3D image in one frame and projects them toward a projection lens. The 3D image projection system is configured so that the left-eye image and the right-eye image having a 2D form, which are projected from a general projector, are magnified so that a vertical magnification rate is 0 and a horizontal magnification rate is 1.5-2.5 times and at the same time divides the images into leftward and rightward directions. The optical system includes a first and second curved surface mirrors or a left and right symmetric eccentric curved surface lens, and a second set of mirrors for reflecting and magnifying the images to be projected toward a screen.

13 Claims, 14 Drawing Sheets

Fig.8
(a)
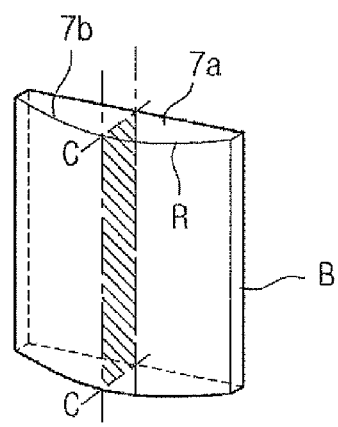
(b)
(c)
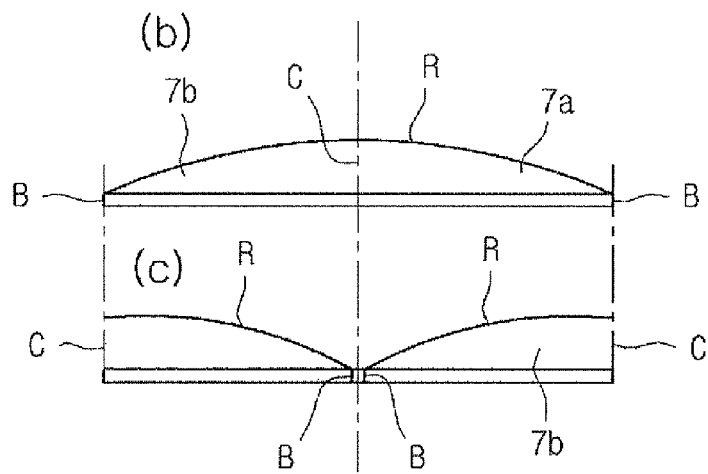
(d)
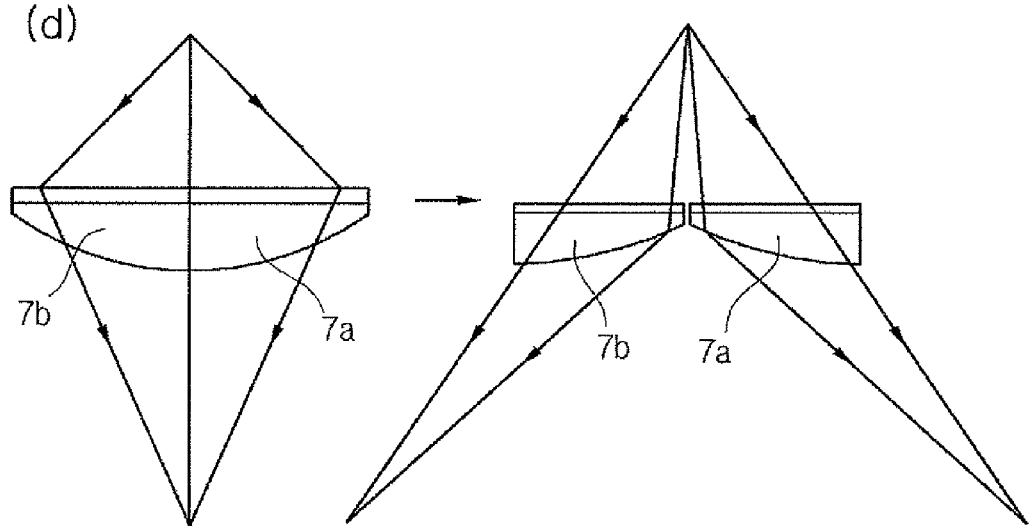

3D IMAGE CONVERTIBLE PROJECTION OPTICAL SYSTEM

CROSS-REFERENCE TO RELATED APPLICATION

This application claims priority of Korean Patent Application No. 10-2010-0119477, filed on Nov. 29, 2010, in the Korean Intellectual Property Office, the entirety of which is hereby incorporated by reference.

BACKGROUND OF THE INVENTION

1. Field of the Invention

The present invention relates to a 3D image projection optical system for converting a 2D projector image into a 3D image on a screen.

2. Description of the Related Art

Currently, 3D images are provided in the market in DVDs and broadcasting for a sports game such as a soccer, etc.

During broadcasting a 3D image, the 3D image is transmitted as one image by reducing a left-eye image 101 and a right eye-image 102 in half to transmit to a left and right side or a top and bottom side in one frame 103.

That is, as in the frame 103 shown in FIG. 1, a picture having a ratio of 16:9, i.e., a lateral size to a vertical size ratio of the left-eye image 101 and the right-eye image 102, is reduced to 8:9 to form one picture 103 having a picture ratio of 16:9 which is input into one channel or one input device.

Here, when the 3D image is projected to a general projector as shown in FIG. 1, the left-eye image 101 and the right-eye image 102 are used to form a screen image 104, which is only viewable as the individual images which are reduced to ½ aspect ratio and viewed on the leftward and rightward or top and bottom sides of the picture, and cannot be viewed as 3D image.

Although there is technology that proposes to separate the left-eye image 101 and the right-eye image 102; according to the technology, even though the left-eye image and the right-eye image are projected on a screen, the images are viewed as vertically elongated images, as shown in the screen image 104 of FIG. 1, which is not practical for viewing. Especially, with respect to a picture size, there is no technology that is able to simultaneously combine the technology that magnifies the leftward and rightward images that leaves the image in its original vertical size with a technology that separates the images.

In order to solve the aforementioned drawbacks, according to a prior art, an electronic division device 105 in which a separate image division and magnification circuit board is embedded is provided in a 3D image projector to divide the left-eye image 101 and the right-eye image 102 placed in one frame 103. After that, the reduced leftward and rightward pictures are magnified to their original sizes and the left-eye image 101 and the right-eye image 102 are projected at a time interval on a screen, as shown in FIG. 1 as 107a and 107b. These images are then viewed through the shutter-type eyeglass for 3D imaging 109 in which the left and right sides are opened and closed in a synchronizing manner.

However, a shutter unit, a synchronizing signal, and a receiving unit, etc., have to be provided on the shutter-type eyeglass 109, and thus the eyeglass itself is heavy and inconvenient and is also expensive. Thus, the shutter-type eyeglass has not been used for a large screen for multiple viewers, which is usually installed in a theater, sports café or assembly hall.

Further, since the time signal for exchanging the left-eye image and the right-eye image have to be received from the screen to the 3D image eyeglass 109 to simultaneously drive the shutters of the 3D image eyeglass, the signal is weakened to a viewer placed at a remote distance from the screen and thus the viewer can not clearly see the 3D image.

Alternatively, a polarization wheel has been provided in front of the 3D image projector through which the left-eye image 101 and the right eye image 102 are projected at a time interval on a screen to be viewed through a 3D image eyeglass 108. However, the polarization wheel configuration has a complicated design and the brightness of the image is reduced by ½ and further is reduced to ½ through the polarization wheel which greatly decreases the picture quality.

Further, the left-eye image 101 and the right-eye image 102 can be respectively projected at different angles and overlapped on a screen 106 by generally using two projectors. The left-eye image 101 and the right-eye image 102 are then viewable by a left eye and a right eye, respectively, as a 3D image by using a polarization eyeglass 108 having the same polarization angle as the projection lens.

In summary, there has been no technology in the prior art except for viewing a 3D image other than a 3D image shutter eyeglass 109 system using one projector and a polarization eyeglass system that uses two projectors or two projection engines.

In these cases, two projectors or a projector having two optical engines are used in order to use the polarization eyeglass. Additionally, a complicated polarization wheel can be used in order to use the polarization eyeglass with one projector.

Accordingly, there is a need for a technology that divides a 3D image combined in one frame 103 and at the same time magnifies and polarizes the image to be clearly viewed by using a general projector through a polarization eyeglass for 3D image viewing.

SUMMARY OF THE INVENTION

The present invention is directed to a 3D image convertible projection optical system that is configured to project a 3D image by magnifying and at the same time dividing a 2D image having a left-eye image 101 and a right-eye image 102, where the left-eye image 101 and right-eye image 102 have been reduced leftward and rightward (vertically) in a picture size of one frame.

The 3D image convertible projection optical system includes a set of curved mirrors and/or eccentric curved lenses which are arranged to magnify the divided left-eye image and the right eye image. The 3D image convertible projection optical system can also include an optical image magnification device and an image division device.

In one embodiment, the 3D image convertible projection optical system includes: a first curved surface mirror configured to receive and magnify the images projected from a projector and at the same time divide the images in leftward and rightward horizontal directions; a second curved surface mirror which is arranged to magnify secondly the leftward and rightward separated left-eye image and right-eye image from the first curved surface mirror, and at the same time projects the images toward a screen; and a polarization filter for polarizing the left-eye image and the right-eye image.

Secondly, according to another embodiment, the 3D image convertible optical system includes a curved surface lens which has a horizontal part which is curved and a vertical part which is flat and is arranged to magnify the image only horizontally. The curved surface lenses are provided horizontally leftward and rightward in front of a projection lens of a general projector. Further, left and right polarization plates are provided on the respective left and right curved surface lens, if necessary, and a reflection mirror is connected to the curved surface lens for magnifying and separating the left-eye image and the right-eye image.

Thirdly, according to another embodiment, the 3D image convertible projection system includes a eccentric curved surface lens for magnifying the images only in the leftward and rightward directions. The eccentric curved surface lens has a horizontal part which is curved and a vertical part which is flat such as the curved surface lens optical system. In this embodiment, the curvature of the eccentric curved surface lens are the same, and the center of the curvature is divided to form two optical axes. Here, a symmetric configuration for the eccentric curved surface lens is made based on the two optical axes to form a dual symmetric structure having an eccentric part, and further a polarization plate is connected to the eccentric curved surface lens, respectively, and if necessary, a reflection mirror is also connected to the eccentric curved surface lens to divide the image into two optical axes.

According to the different embodiments of the present invention, a 3D image convertible projection optical system may be connected easily on to a front surface of a projection lens of a general projector to allow the division of the left-eye image and right-eye image into leftward and rightward directions and at the same time the reduced images are magnified to their original size and projected at different polarization angles on a screen where the images are combined on the screen to allow the viewing of the 3D image through a polarization eyeglass using a general projector.

Specially, these images are 2-4 times brighter and clearer as the prior 3D projectors. Additionally, the 3D image convertible projection optical system has a reduced cost and is light-weight. Still further, the optically system allows the viewing of the 3D image using a polarization eyeglass without requiring a separate electronic device, a separate complicated polarization wheel device or a separate synchronization signal in a theater, class or assembly hall.

Furthermore, the 3D image convertible projection optical system according to the present invention may be assembled or disassembled to an existing projector. By assembling the optical system to a projector, the 3D image can be viewed. In the case where the 3D image convertible projection optical system is disassembled, 2D image can be viewed using the prior projector.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 8($a$) is a perspective view showing a curved surface lens according to the present invention;

FIGS. 8($b$) and 8($c$) is a perspective view showing an eccentric curved surface lens which is formed symmetrically leftward and rightward by dividing the curved surface lens into two parts;

FIG. 8($d$) is a perspective view showing a double axis of the eccentric curved surface lens;

DETAILED DESCRIPTION OF EXEMPLARY EMBODIMENTS

Figure 1:
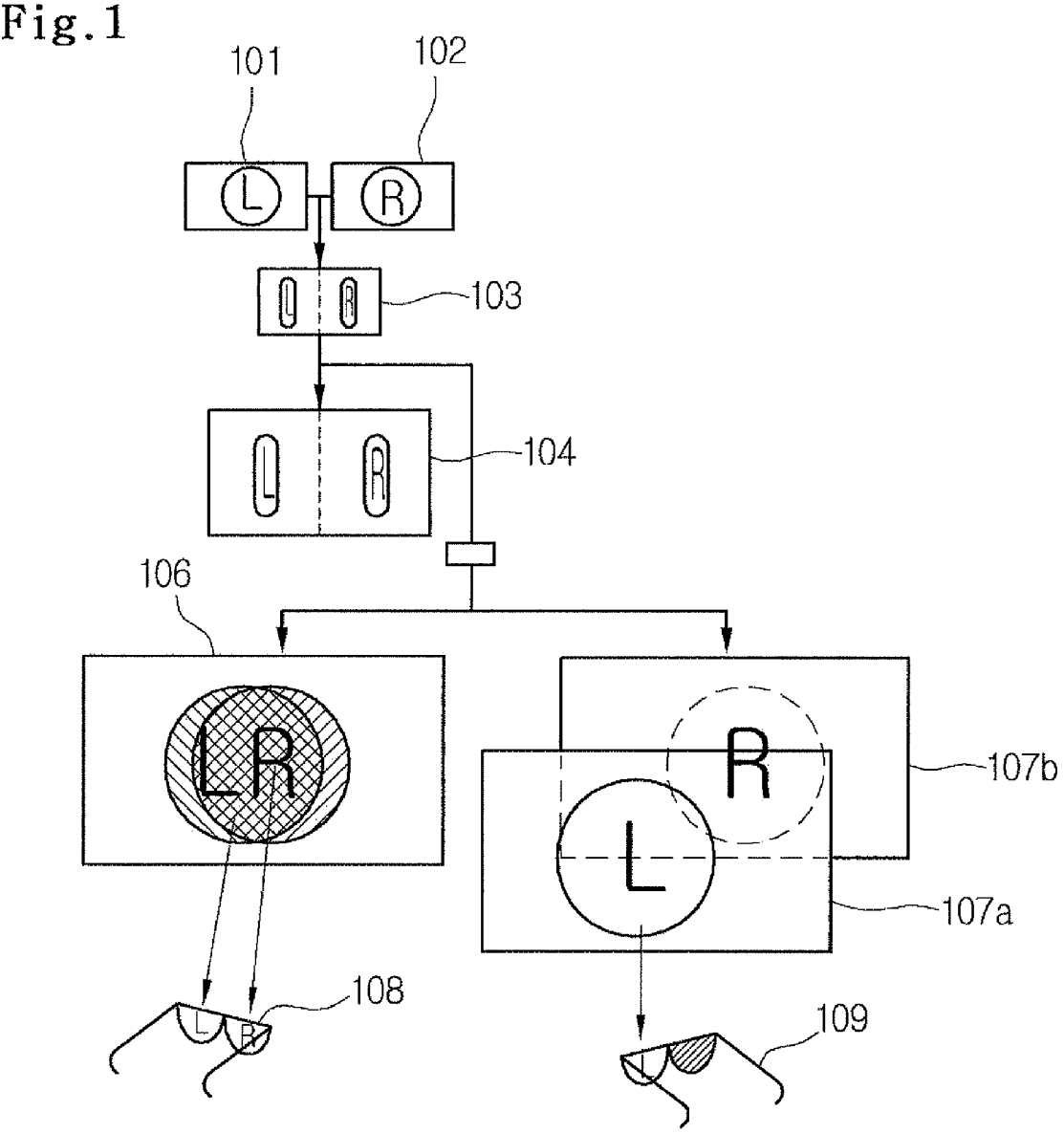
FIG. 1 is a view showing the images which are varied during a 3D image transmitting procedure for 3D image that is broadcasted and 3D image from a disc.

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another element.

The 3D image convertible projection optical system according to the present invention may be applied to a projector that projects a 2D image that has a left-eye image and a right-eye image combined in one frame for projection through a projection lens. The 3D image convertible projection optical system is configured to combine the left-eye image and the right-eye image which can be projected leftward and rightward, i.e., side by side, or vertically, i.e., top and bottom, to transmit the combined image as a 3D image.

Typically, a 3D image that is transmitted for a general 3D image TV broadcasting or blu-ray disc is configured in such a manner that, as shown in FIG. 1, the left-eye image 101 and the right-eye image 102 are arranged as one image side by side or top and bottom in one frame 103.

Here, the arrangement of the image is mainly described based on side by side, i.e., leftward and rightward, configuration for description convenience; however, in principle the arrangement of the image may be applied similarly to a top and bottom configuration.

Generally, a picture ratio of a lateral length to a vertical length of an image for TV or DVD may be 16:9, and further may be 2.35:1, etc., for a movie image. Here, the 3D image convertible projection system will be described based on a picture ratio of 16:9 for description convenience.

In order to convert the left-eye image 101 and the right-eye image 102 into 2D form in frame 103, the following conditions are typically necessary.

First, in one frame configuration the left-eye image 101 and the right-eye image 102 are divided into the separate left-eye image 101 and the right-eye image 102. This separation allows the left-eye image 101 and the right-eye image 102 to be input at the same time into one frame 103, as shown in FIG. 1. At this stage, the left-eye image 101 has to be viewed through a left eye and the right-eye image 102 has to be viewed through a right eye, respectively, i.e., the images are viewed separately.

Second, as shown in FIG. 1, the left-eye image 101 and the right-eye image 102, where the image picture is reduced in size in the one frame 103, are then magnified to their original size as the screen image 106, 107a and 107b.

Third, with respect to a magnification rate, where the left-eye image and the right-eye image are arranged side by side, the images are magnified only horizontally to 1.5-2.5 times their original size, as seen in the reduced left-eye image 101 and right-eye image 102 as the screen 104 in FIG. 1. On the other hand, when the left-eye image and the right-eye image are arranged top and bottom, the images are magnified only vertically to 1.5-2.5 times. Here, 1.5 times picture is effective when the input picture ratio is 2.35:1, and 2.5 times picture is effective when the input picture ratio is 4:3.

Fourth, the left-eye image 101 and the right-eye image 102, which are divided and magnified, are divided at different polarization angles as seen in the image on screen 106, and then combined onto one screen at a picture ratio of 16:9-2.35: 1. Even though the left-eye image 101 and the right-eye image 102 are overlapped on the screen 106, the left-eye image 101 and the right-eye image 102 can be viewed separately by a viewer's left eye and right eye, respectively, through a polarization eyeglass to allow the viewing of the 3D image.

Fifth, the division, magnification, polarization and projection operations are performed simultaneously in one optical system since in cases where the division and magnification are performed separately, brightness of the image may be lost and picture resolution may be decreased. Additionally, when an image is not polarized and projected simultaneously, a polarization degree is not kept which prevents the formation of a 3D picture. Furthermore, when the 3D image convertible projection optical system is arranged in as a separate case 1, the separate case has a large volume and is heavy, which makes the case difficult to assemble on a general projector.

Hereinafter, exemplary embodiment of the present invention will be described in detail with reference to the drawings.

The 3D image convertible projection optical system may be applied to a projection lens 300 of a general projector 200 to determine a projection distance. Here, a focal point distance of a standard projection lens of the projector 200 may be 30 mm or less, and the description of the 3D image convertible projection optical system will be made based on the focal point distance of 30 mm of the standard projection lens. In case where the projection lens having different focal point distances, the principle may be applied similarly thereto.

Embodiment 1

Figure 3:
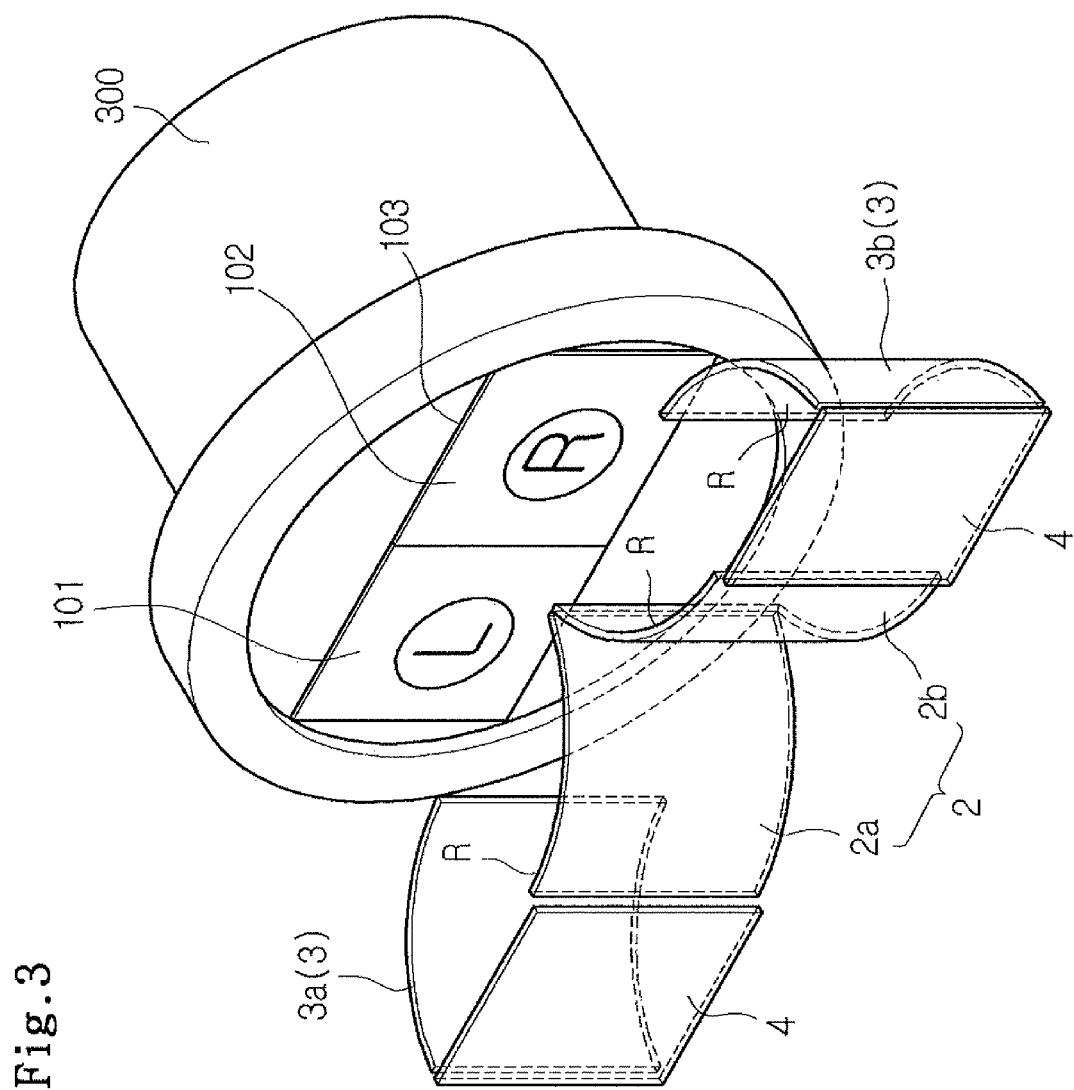
FIG. 3 is a perspective view showing a configuration of a first and second curved surface mirror according to the present invention.
Figure 4:
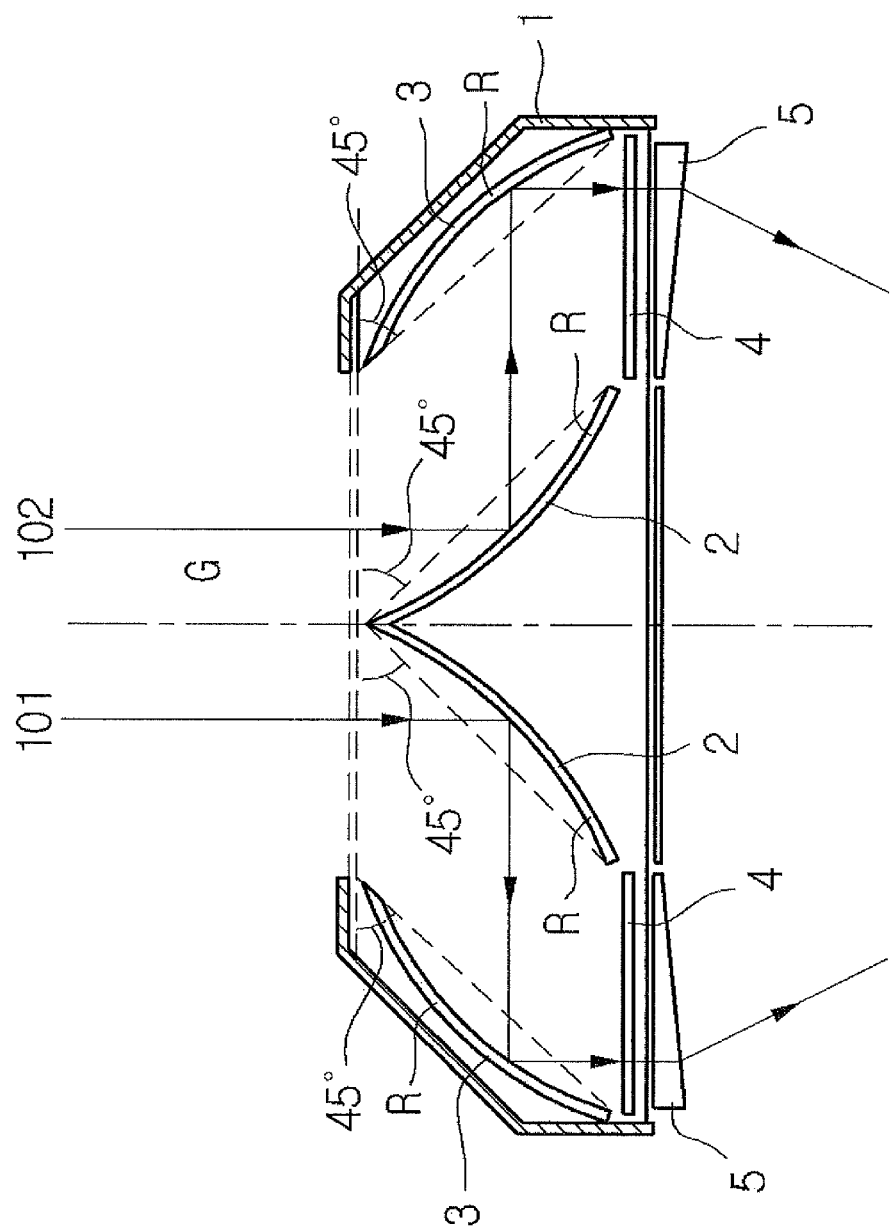
FIG. 4 is a cross-sectional view showing the first and second curved surface mirror shown in FIG. 3.

FIGS. 3 and 4 show a 3D image convertible projection optical system according to the present invention including first and second curved surface mirrors 2, 3. The first curved surface mirror 2 includes left and right first curved surface mirrors 2a, 2b, which are symmetrically arranged at an inclination angle of 45° based on a center line of the projection lens 300, and are provided in front of the projection lens. The second curved surface mirror 3 includes left and right second curved surface mirrors 3a, 3b, which are symmetrically arranged at the same inclination angle as the left and right first curved surface mirrors 2a, 2b to project the image toward a screen. The second curved surface mirrors 3a, 3b are provided on left and right sides of the respective left and right first curved surface mirrors 2a, 2b. Additionally, polarization plates 4, which are parallel to the projection lens, are provided in front of the left and right first curved surface mirrors 2a, 2b, respectively, and are arranged to have different left and right polarization angles. In this embodiment, the left-eye image and right-eye image for a 3D image are combined in one frame and are then divided and magnified and then polarized at a pre-determined polarization angle through the aforementioned configuration. After that, the divided left-eye image and the right-eye image are projected in an overlapping manner on a screen.

Further, the curved surface has a curvature determined such that a ratio of the size of the top and bottom of the picture to the size of the left and right of the picture of the left and right first curved surface mirrors 2a, 2b and the left and right second curved surface mirrors 3a, 3b is 1.5:2.5. Additionally, the curvature of the left and right first curved surface mirrors 2a, 2b and the left and right second curved surface mirrors 3a, 3b is a non-spherical surface.

Alternatively, any one of the left and right first curved surface mirrors 2a, 2b and the left and right second curved surface mirrors 3a, 3b is a plain surface, so that a magnification rate of the rest of the curved surface mirrors is 1.5-2.5 based on the top and bottom picture size to the left and right picture size.

The aforementioned configuration is arranged as a separate case so that it may be connected to an existing projector and separated from the existing projector.

Alternatively, the aforementioned configuration may be connected to a projection lens of a projector.

In more detailed description, as shown in FIGS. 3 and 4, two left and right first curved surface mirrors 2 are arranged symmetrically at an inclination degree of 45° based on a centre of an inner rear surface of a case 1 on opposite sides in front of the left-eye image and the right-eye image in leftward and rightward directions. Additionally, two left and right second curved surface mirrors 3 are arranged symmetrically at an inclination degree of 45° in a front part of the left and right first curved surface mirrors 2, respectively, to receive the reflected image from the first curved surface mirrors.

When the image projected from a projector for 2D imaging is transmitted as one image formed by reducing a left-eye image and a right-eye image for 3D imaging to a ½ size and arranged in one frame and projected to a projector lens, the left-eye image and right-eye image are divided leftward and rightward. Then the reduced and divided images are magnified to an original size using the left first curved surface mirror 2a which is arranged at an left inclination angle of 45° and right first curved surface mirror 2b which is arranged at a right inclination angle of 45° based on a vertex where the left first curved surface mirror and the right first curved surface mirror are arranged linear symmetrically to have a triangular form having the vertex on which a center line c of the projection lens 300 is arranged, as seen in FIGS. 3 and 4. Further, the left second curved surface mirror 3a and the right second curved surface mirror 3b are arranged at a left inclination angle of 45° and a right inclination angle of 45°, respectively, in parallel to the left curved surface mirror 2a and the right first curved surface mirror 2b.

In addition, a polarization plate 4 having different left and right polarization angles is provided at front locations of the left second curved surface mirror 3a and the right second curved surface mirror 3b, and are parallel to the projection lens 300. These elements may also be provided in one case 1 for easier handling and connection to a projector or projector lens.

As a result, the image is divided into two parts by the left first curved surface mirror 2a and the right first curved surface mirror 2b on the center c of the projection lens 300, as shown in FIG. 4, and reflected and refracted leftward and rightward towards the second curved surface mirrors. The second curved surface mirror 3a and the right second curved surface mirror 3b then reflect and refract the images toward a screen to be projected through the left and right projection plates 4 which are arranged in parallel to the projection lens.

Here, a horizontal part of the first and second curved surface mirrors 2, 3 is configured as a curved surface A having a curvature R and a vertical part B thereof is configured as a plain surface, that is, only one part of the first and second curved surface mirror is curved.

Meanwhile, the curvature R of the first and second curved surface mirrors 2, 3 is as follows.

A focal point distance of a standard projection lens of a general projector is 30 mm. As a result, according to the present invention, the lateral picture sizes of the divided left-eye image 101 and right-eye image 102 are magnified to 1.5-2.5 times and the top and bottom images are not magnified.

Figure 13:
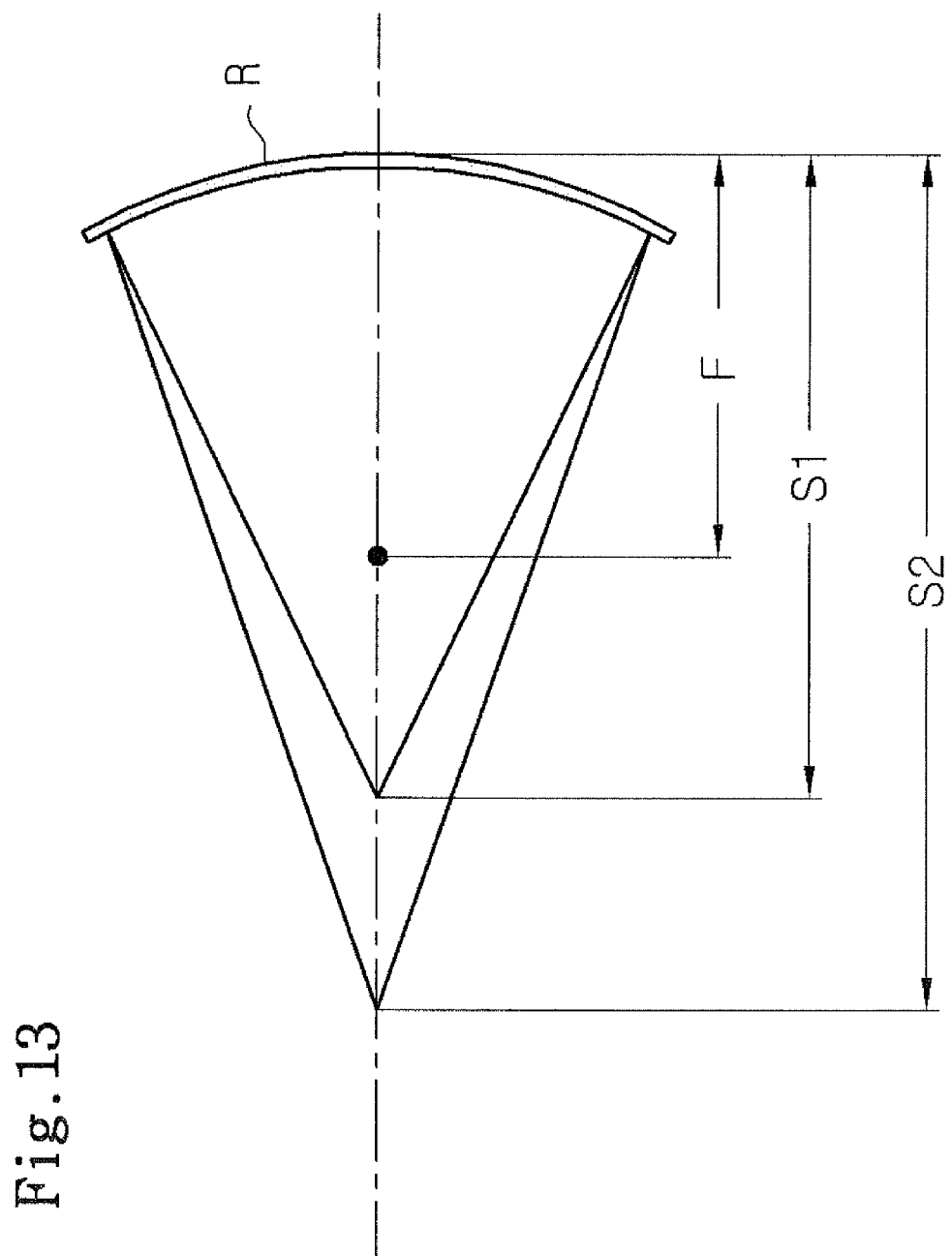
FIG. 13 is a perspective view showing an optical operation of a spherical mirror according to the present invention.

A magnification rate formula for a spherical mirror, as shown in FIG. 13, having a focal point distance F and a curvature R is F=R/2. In addition, the relationship between a first focal point distance of the spherical mirror S1 and a second focal point distance of the spherical mirror S2 can be defined as: 1/F=1/S1+1/S2.

Furthermore, the magnification rate can be defined as M=S2/S1, where the relation between S1 and S2 is 1/F=1/S1+1/S2, as discussed above. For example, a magnification rate 2 equals to $1.414^2$ due to area comparison.

Accordingly, when a focal point distance of a projection lens to which the 3D image convertible projection optical system is attached is 30 mm, a focal point distance of a vertical picture is not varied, that is, the focal point distance is 30 mm, a focal point distance of a horizontal picture is about 21.5 mm (30 mm/1.442)

In a similar principle, a magnification rate 1.5 times=$1.22^2$ and 2.5 times=$1.58^2$, and thus a focal point distance of the first and second curved surface mirrors 2, 3, F is within 18.9-24.5 mm, corresponding to the magnification rate of 1.5-2.5.

Here, a relation between the focal point distance F and the curvature R is F=R/2 and thus the curvature of the first and second curved surface mirrors 2, 3 is within 18.9-24.5 mm. Additionally, the curvature R is divided through the first curved surface mirror 2 and the second curved surface mirror 3 to be 75.6-98 mm.

That is, only a horizontal magnification rate of a summation of the curvatures R of the first and second curved surface mirrors 2, 3 is 1.5-2.5.

As discussed above, polarization plates 4 may also be provided at a front surface of the left and right second curved surface mirror 3. Furthermore, an eccentric prism 5 may be provided on a front surface thereof, if necessary.

Figure 5:
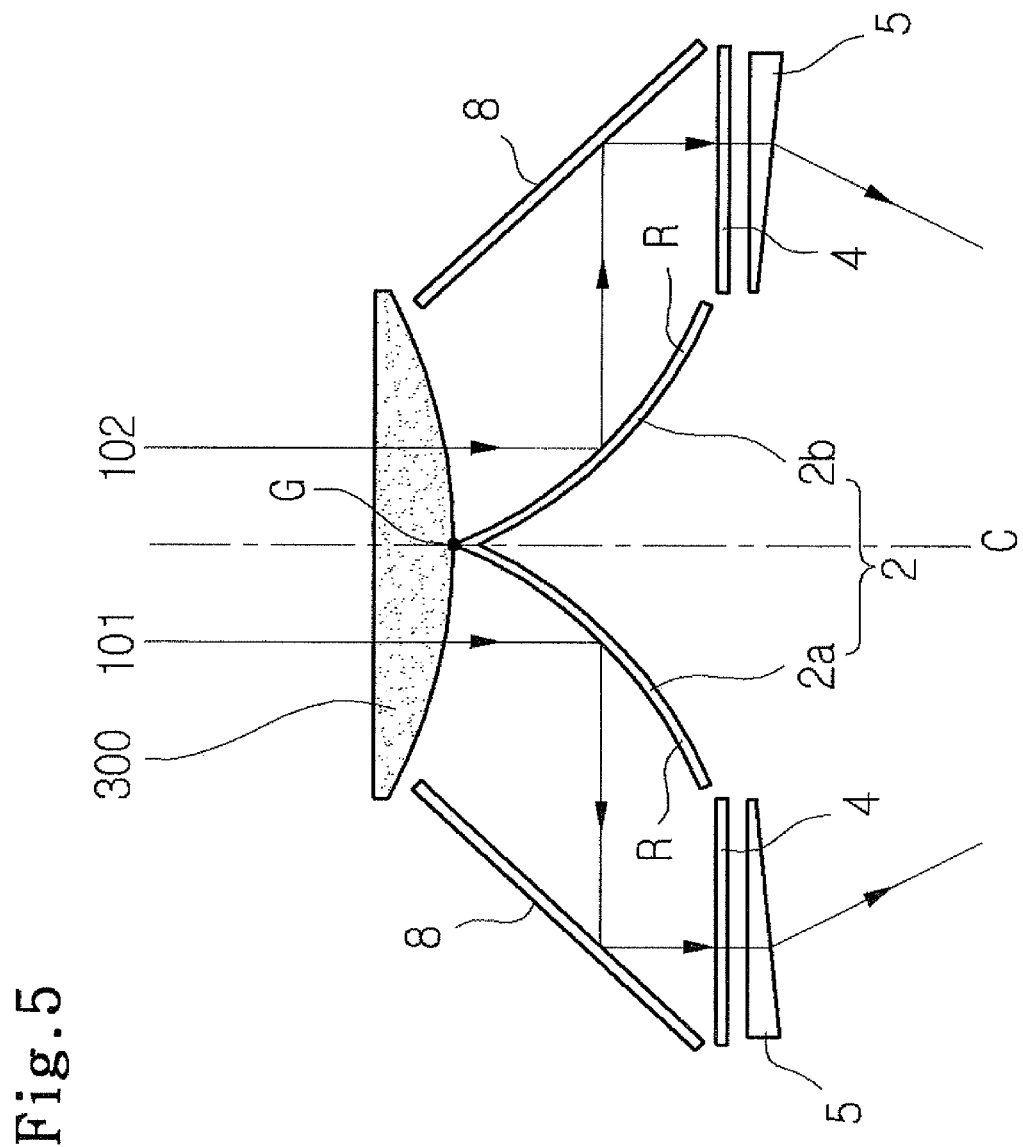
FIG. 5 is a perspective view showing an exemplary embodiment of the first and second curved surface mirror according to the present invention.
Figure 6:
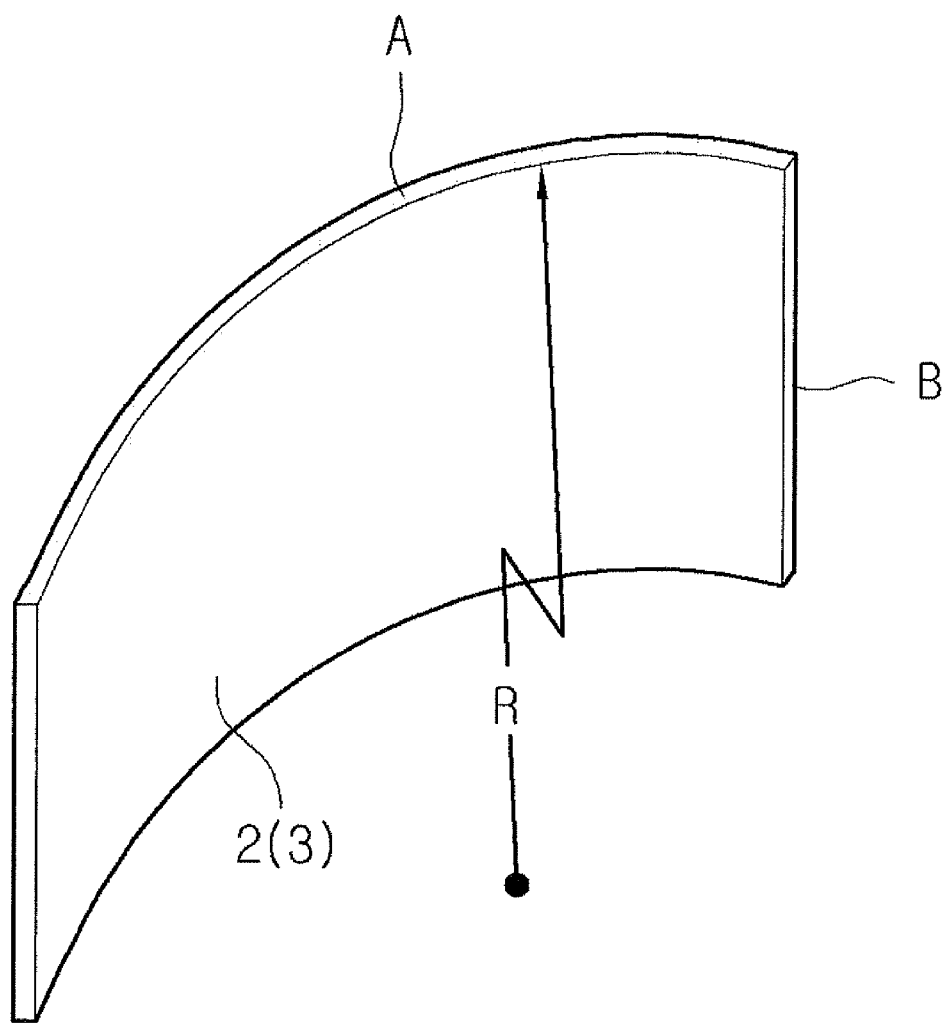
FIG. 6 is a view showing a configuration of the first and second curved surface mirror according to the present invention.

The eccentric prism 5 has a relative small apical angle, as shown in FIGS. 4 and 5, and is provided mainly for compensating the projection direction. Here, since a chromatic aberration may occur to the eccentric prism 5, a glass element having a different refraction rate may be attached to the eccentric prism 5 for eliminating the chromatic aberration.

Through this configuration of the 3D image convertible projection optical system according to the present invention, the left-eye image 101 and the right eye-image 102 input into one frame 103 with respect to a general projector 200, as shown in FIG. 1, are divided leftward and rightward through the left and right first curved surface mirrors 2, and then the horizontal images of the left-eye image and right-eye image are magnified to 1.5-2.5 times their size using the second curved surface mirrors 3 which also projects the images toward a screen. After that, the images are polarized by the left and right polarization plates 4 provided in front of the left and right second curved surface mirrors 3.

That is, the 3D image convertible projection optical system is arranged to divide and at the same time magnify the image leftward and rightward, and then polarize the image through one optical system for projection on a screen in an overlapping manner.

Additionally, the eccentric prism 5 may be further provided to adjust a left and right interval of the left-eye image 101 and the right-eye image 102.

Embodiment 2

As shown in FIG. 5, a second embodiment of the present invention is shown where a 3D image convertible projection optical system has one of the first surface mirror 2 or the second surface mirror 3 as a plain surface and the other surface mirror is curved where the horizontal magnification rate of the curved surface mirror is 1.5-2.5 times.

Here, a principle and operation of the 3D image convertible projection optical system is the same as shown in FIGS. 3 and 4. For example, a curvature R of one of the first curved surface mirror 2 or the second curved surface mirror 3 is 37.8-49 mm which is twice as long as that of the first and second curved surface mirrors 2, 3 of the first embodiment.

In this case, a vertical picture magnification rate is 0 and a horizontal picture rate is 1.5-2.5 times, comparing to a focal point distance of a projection lens of a general projector 200.

Therefore, according to the 3D image convertible projection optical system, as similar to the first embodiment, the left-eye image 101 and the right-eye image 102 are divided at the same time and magnified leftward and rightward, and then polarized to be separated by one optical system which projects the image on a screen in an overlapping manner.

Embodiment 3

In a third embodiment, which is different from the lens and mirror configuration of the first and second curved surface mirrors 2, 3 of the first and second embodiments, is configured so that there is no chromatic aberration and minimizes the decrease in brightness and a volume of the system.

Figure 7:
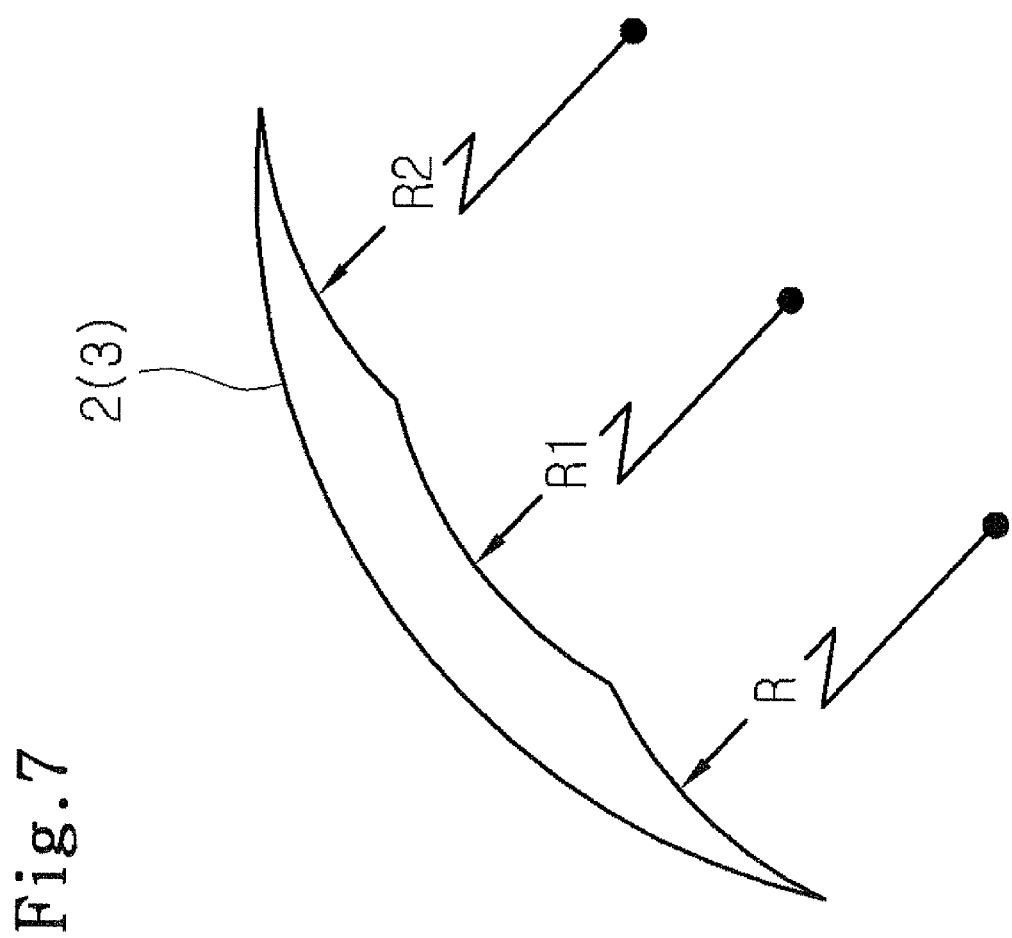
FIG. 7 is a perspective view showing a non-curved surface mirror according to the present invention.

With respect to a horizontal magnification rate, the chromatic aberration, e.g., having a trapezoid form in the leftward and rightward directions, may occur in the projected images. Here, in order to compensate for the chromatic aberration, as shown in FIG. 7, a plurality of curvatures are overlapped on one curved surface A to form a non-spherical surface.

That is, in case of a main curvature R being 150 R(mm), as going to a surrounding, R1=160R, and R2=170R and as a result a non-spherical surface is formed to compensate for the chromatic aberration. According to the present embodiment, an enlarged chromatic aberration may be eliminated in a curved surface mirror.

Embodiment 4

Figure 2:
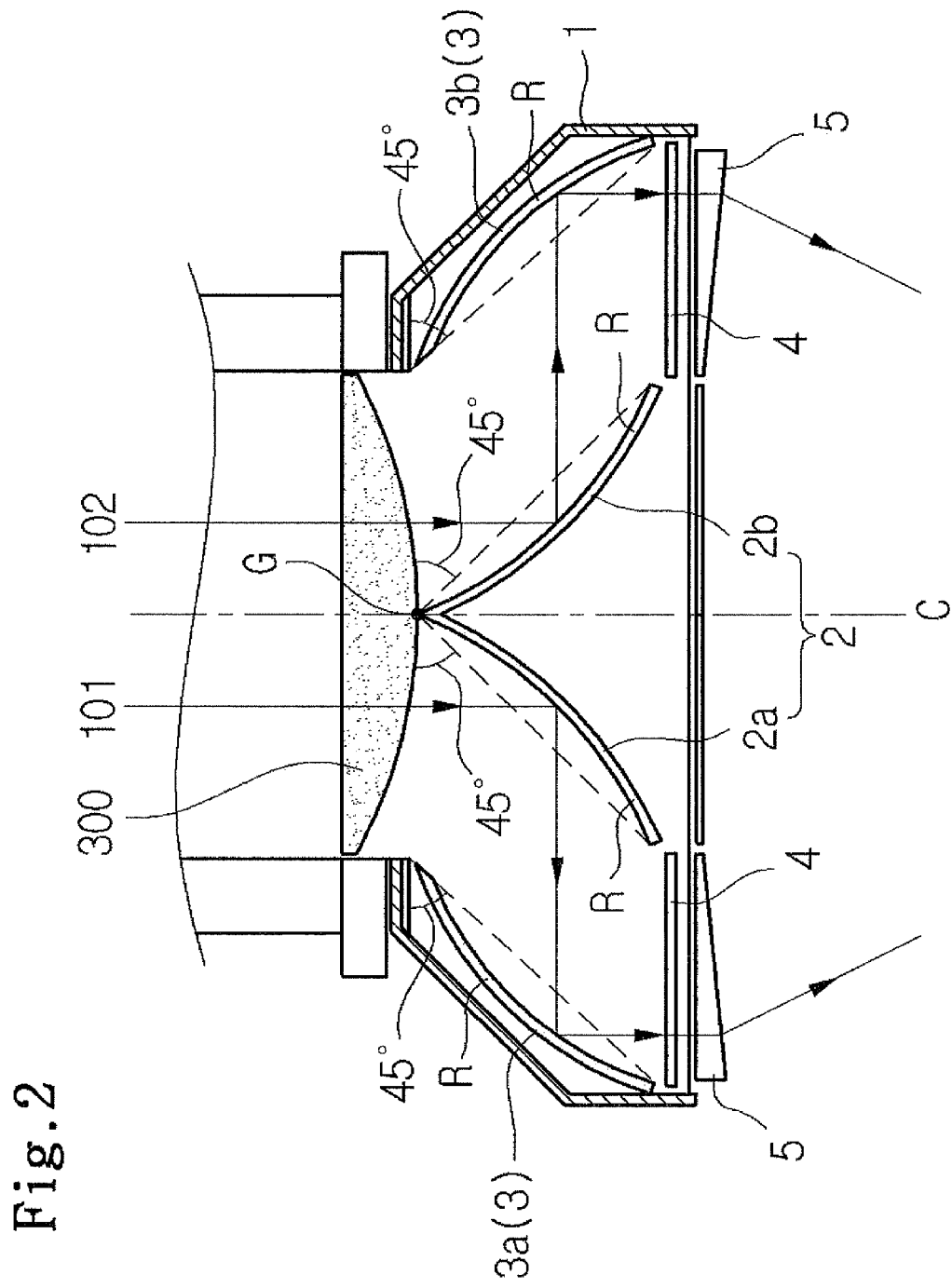
FIG. 2 is a perspective view showing a 3D image convertible projection optical system according to the present invention.

According to the fourth embodiment, a 3D image convertible projection optical system is configured in such a manner that any one of the configurations as set forth in the first through third embodiments is provided in a separate case 1, as shown in FIG. 4, and is assembled or disassembled to a general projector 200, as shown in FIG. 2. Further, the 3D image convertible projection optical system may be connected to a general projector itself 2 without being restructured. That is, any one of 3D image convertible projection optical systems as set forth in the first through third embodiments may be connected to a projection lens of a general projector 200.

Embodiment 5

Figure 9:
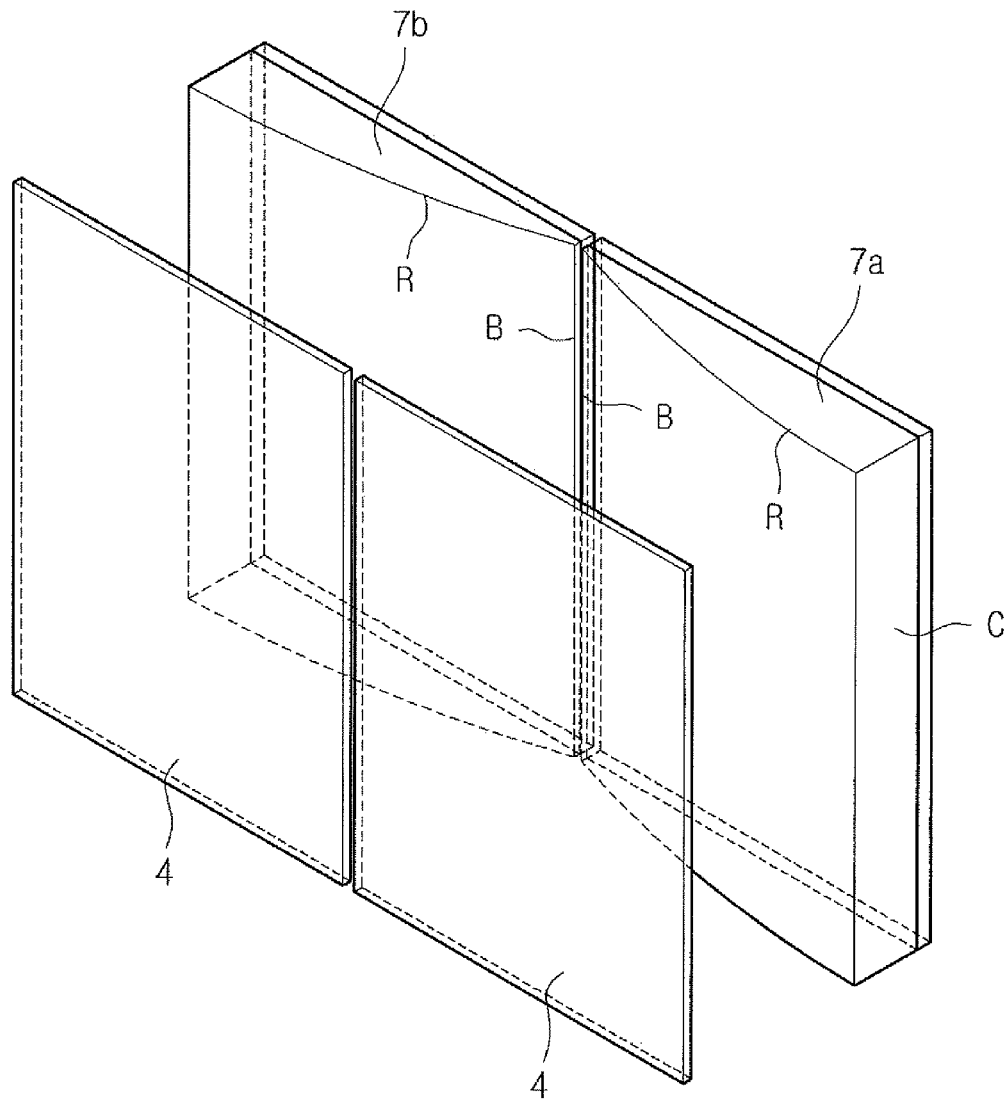
FIG. 9 is a perspective view showing a left-right eccentric curved surface lens according to the present invention.

According to the fifth embodiment, a 3D image convertible projection optical system is configured in such a manner that a curved surface lens has a horizontal part which is curved and a vertical part which is straight provided in front of a projection lens of a projector which receives the left-eye image 101 and the right eye-image 102 in one frame 103 and projects the image, as shown in FIG. 9.

As shown in FIGS. 8(a), 8(b), and 8(c), the curved surface mirror has a horizontal part which is curved and a vertical part which is straight where a center c of the curved surface lens 6 is divided vertically as indicated by line C-C to form a left eccentric curved surface lens 7a and a right eccentric curved surface lens 7b. Alternatively, as further shown in FIG. 8(c), the left surface and right surface of the left eccentric curved surface lens 7a and the right eccentric curved surface lens 7b can be exchanged to be arranged symmetrically so that the left eccentric curved surface lens 7a and the right eccentric curved surface lens 7b has their outer surface B placed at a center of the curved surface mirror and the previous center part C is placed at outward sides.

The left and right eccentric curved surface lens 7a, 7b have the same curvature R and thus, as shown in FIG. 8(d), one image formed by one optical axis before division is divided by two optical axes to separate the left-eye image 101 and the right-eye image 102.

As shown in FIG. 9, a left polarization plate 4 and a right polarization plate 4 are provided in front of the respective eccentric curved surface lens 7a, 7b which magnifies and separates the left-eye image 101 and the right-eye image 102 projected from a projector.

At this time, a left and right magnification rate of the left and right eccentric curved surface lens 7a, 7b is 1.5-2.5 times a vertical picture magnification rate. A formula for the magnification rate is as follows.

Figure 14:
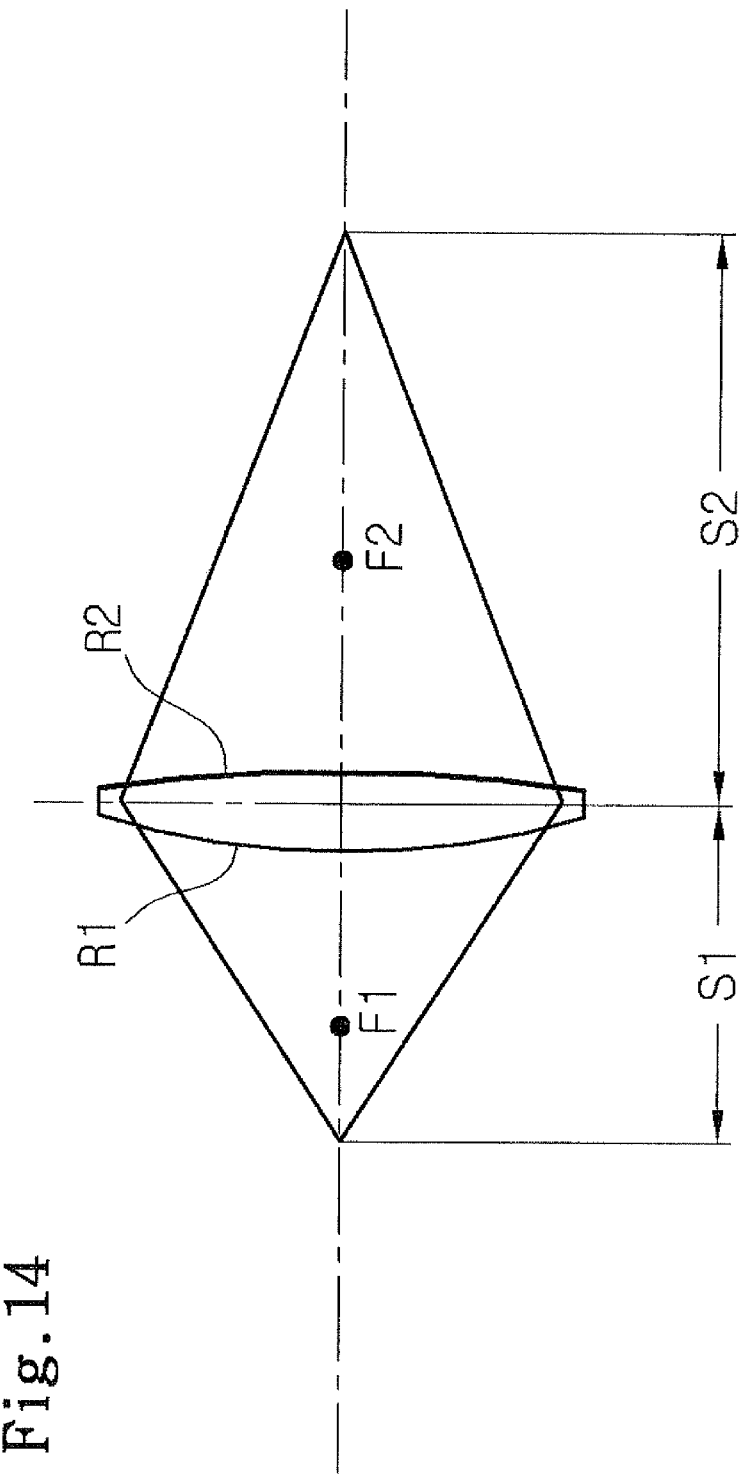
FIG. 14 is a perspective view showing an optical operation of a curved surfaced mirror according to the present invention.

As shown in FIG. 14, a formula for a focal point distance for difference surfaces of a lens is provided as, F=(1−ND)(1/R1+1/R2) where ND is a refraction rate of a lens glass element, assuming that a standard refraction rate is 1.50, R2 is a curvature of a lens front surface, and R1 is a refraction rate of a rear surface of the lens. In so doing, F1 defines the first focal point formed to the rear surface of the lens, and F2 defines the second focal point formed to the front surface of the lens.

Here, according to the formula for a focal point distance based on 30 mm of a focal point distance for a projection lens of a general projector 200, the focal point distance F is 47-103 mm.

In this case, a horizontal magnification rate of the left and right eccentric curved surface lens 7a, 7b is 1.5-2.5 times and a vertical magnification rate is 0 to form a lateral magnification lens.

The lens having one curvature R is divided into two optical axes through the optical system configured as set forth above to have the same performance as the embodiments discussed above. Additionally, by having the two eccentric axes errors caused by the left lens and right lens are eliminated.

Embodiment 6

Figure 10:
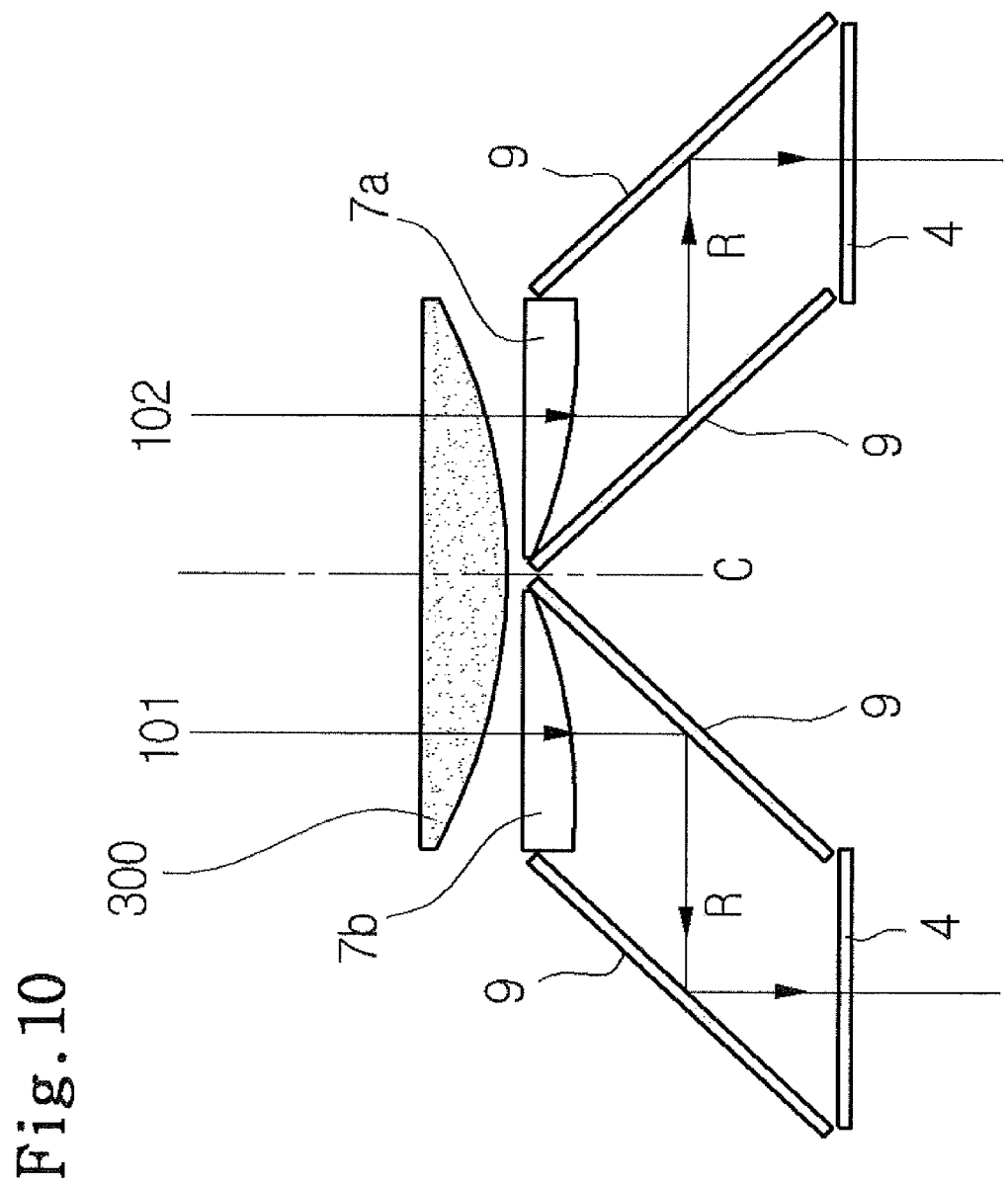
FIG. 10 is a perspective view showing an exemplary embodiment of the left-right curved surface lens according to present invention.

According to the sixth embodiment, as shown in FIG. 10, the left and right reflection mirrors 9 are provided in a front surface of the left and right eccentric curved surfaces 7a, 7b.

Embodiment 7

According to the seventh embodiment, the fifth and sixth embodiments are provided in a separate case 1 to be assembled or disassembled on a general projector 200. Here, an interval of the divided image of the left-eye image 101 and the right-eye image 102 is adjusted by a reflection plate 9 and a polarization plate 4 and polarized by the polarization plate 4 which is then projected on one screen.

Embodiment 8

Figure 11:
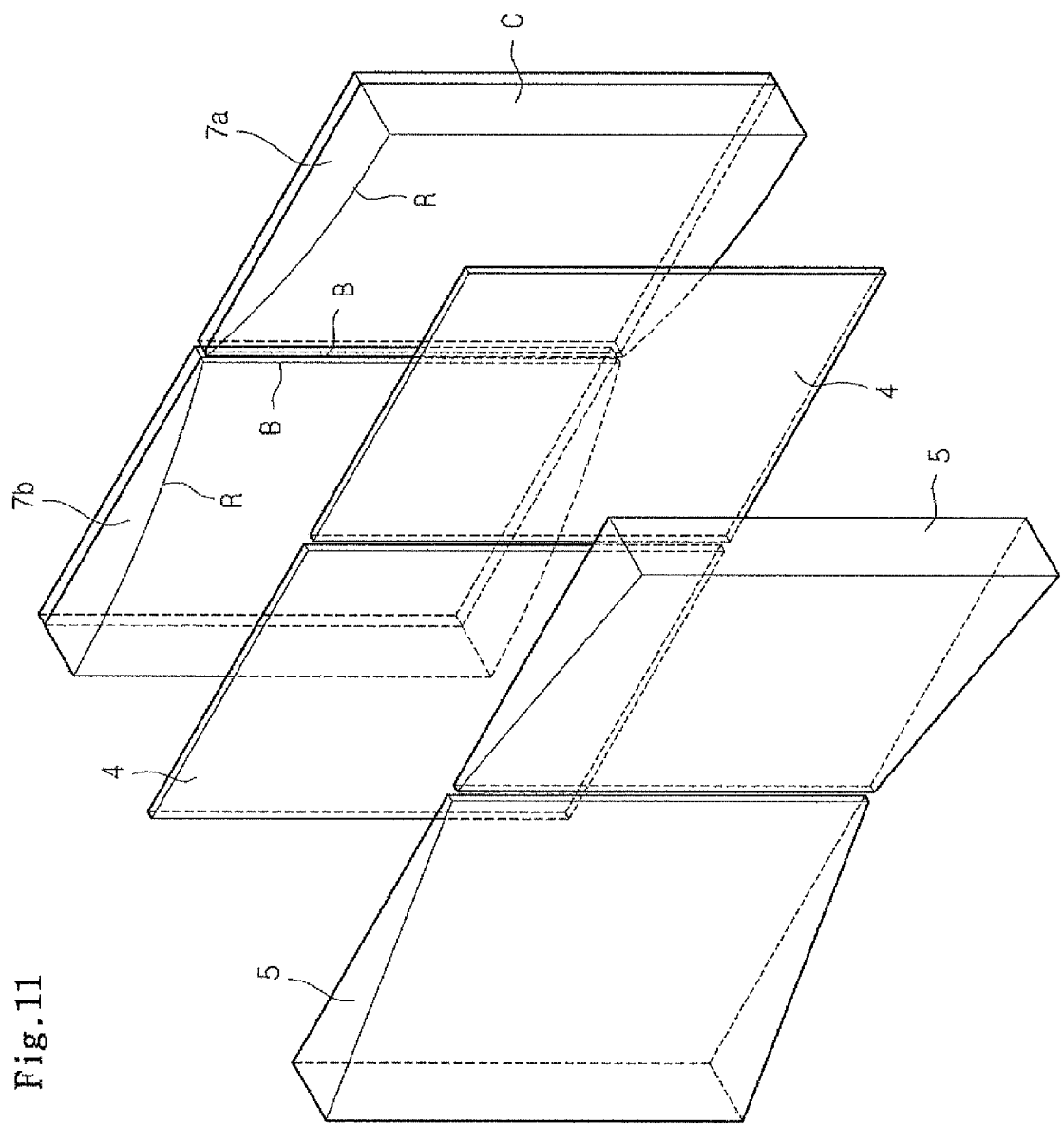
FIG. 11 is a perspective view showing a configuration of a curved surface according to the present invention.

As shown in FIG. 11, an eighth embodiment has a curved surface lens configured in such a manner that a horizontal part of the lens is curved and a vertical part thereof is flat. The curved surface lens are provided leftward and rightward sides and further has two polarization plates 4 provided in front of the left and right curved surface lenses which magnify and divide the left-eye image and the right-eye image projected from a projector.

That is, according to the present embodiment, the curved surface lens 6 and the polarization plate 4 are provided where a horizontal part of the curved surface lens 6 is curved having a curvature R and a vertical part is flat, or the horizontal part and the vertical part of the curved surface lens are all curved in which a rate of a focal point distance of the horizontal part b and the vertical part a is 1.5-2.5 to 1.

In the case where the horizontal part and the vertical part of the lens are curved having a curvature R in order to reduce a lens aberration, a magnification rate of a horizontal surface to a vertical surface has to be 1.5-2.5 times.

Figure 12:
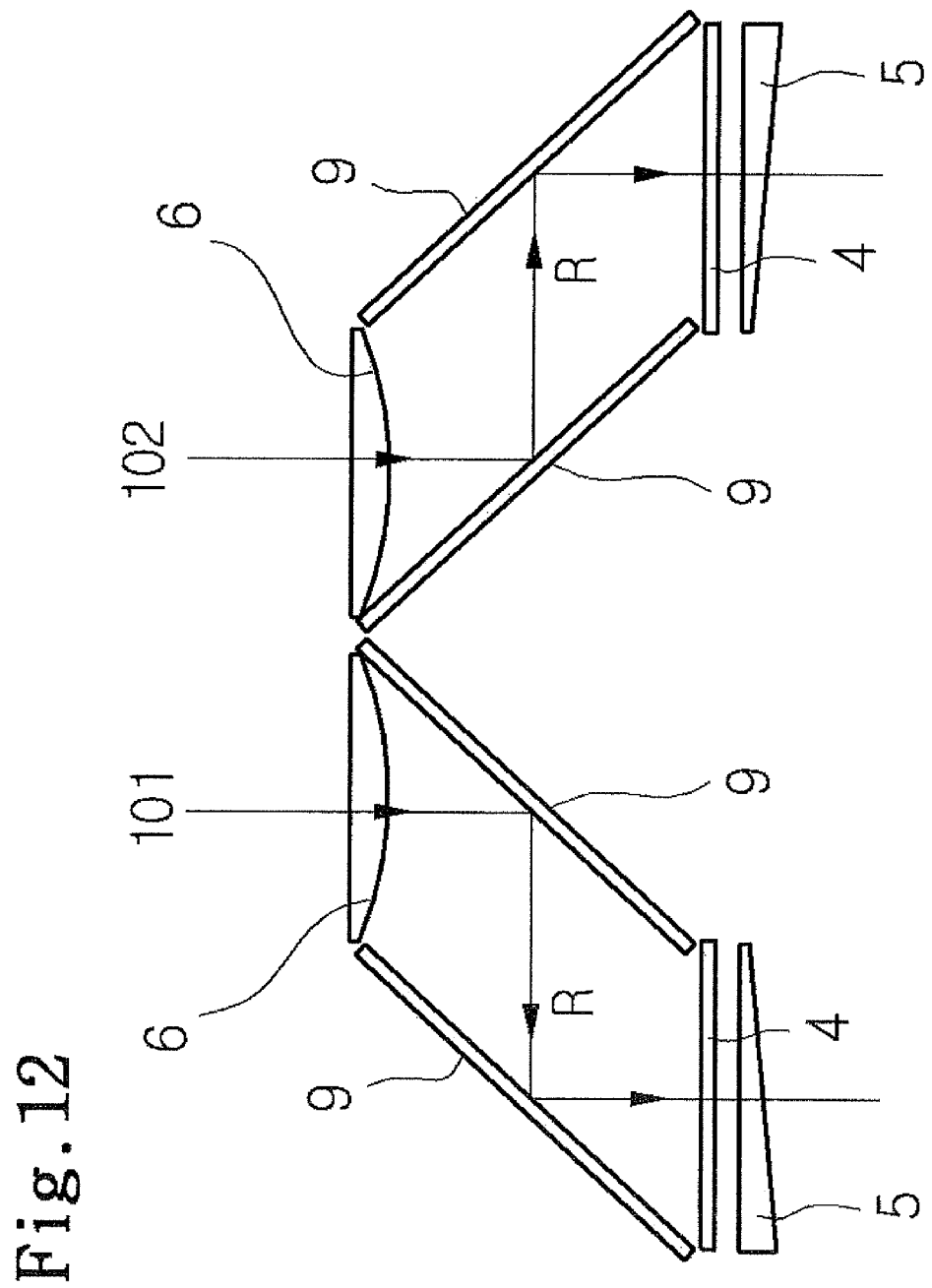
FIG. 12 is a perspective view showing an exemplary embodiment of the curved surface lens according to the present invention.

Meanwhile, as shown in FIG. 12, a eccentric prism 5 can be provided on the leftward and rightward sides in front of the left curved surface lens 6a and the right curved surface lens 6b, respectively, and a reflection mirror 9 can be also provided on a left and right sides of the left curved surface lens 6a and the right curved surface lens 6b, respectively.

Similar to the first embodiment, this optical system is configured so that the left-eye image 101 and the right-eye image 102 are divided at the same time and magnified horizontally using the one optical system, and then polarized to project the image on a screen in an overlapping manner.

Embodiment 9

According to the ninth embodiment, one of the configurations of the fifth and sixth embodiments is provided in a separate case 1 to be assembled or disassembled on to a general projector 200.

Accordingly, the configuration as set forth in the above embodiments are configured in an optical system, and the 3D image convertible optical system is provided in a separate case 1 to be assembled or disassembled to an outside of a projection part of a general projector 200 where the left-eye image 101 and the right-eye image 102, which are arranged side by side in one frame 103, are magnified only horizontally to 1.5-2.5 times. Further, in the case where the left-eye image 101 and the right-eye image 102 are arranged in a top and bottom manner, they are magnified vertically by 1.5-2.5 times, similar to the side by side arrangement of the images.

Accordingly, the left-eye image 101 and the right-eye image 102, which are arranged side by side, or in a top and bottom manner, are divided into two images, are magnified horizontally or vertically depending on choice, to 1.5-2.5 times.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A 3D image convertible projection optical system comprising:
    at least two first surface mirrors arranged to be placed in front of a projector or projection lens and configured to divide and at the same time magnify a left-eye image and right-eye image received from the projector;
    at least two second surface mirrors facing the at least two first surface mirrors and arranged at an inclination angle for receiving and reflecting the left-eye image and the right-eye image from the at least two first surface mirrors toward a viewing screen; and
    polarization plates arranged in front of the at least two second surface mirrors.

2. The 3D image convertible projection optical system of claim 1, wherein the first and second surface mirrors are arranged to magnify the left-eye image and right-eye image by about 1.5 to about 2.5 times in either a horizontal or vertical direction of the left-eye and right-eye image.

3. The 3D image convertible projection optical system of claim 1, wherein said at least two first surface mirrors are curved in either a width or length direction and flat in the other direction.

4. The 3D image convertible projection optical system of claim 1, wherein the at least two first surface mirrors have a curved structure and the at least two second surface mirrors have a non-curved structure.

5. The 3D image convertible projection optical system of claim 1, wherein at least one of the at least two second surface mirrors is a flat mirror and the other surface mirrors are arranged to magnify the left-eye image and right-eye image by about 1.5 to about 2.5 times.

6. The 3D image convertible projection optical system of claim 1, wherein the 3D image convertible projection optical system is arranged as a separate case and configured to be assembled or disassembled onto the projector.

7. The 3D image convertible projection optical system of claim 1, wherein the 3D image convertible projection optical system is configured to be connectable to a projection lens of the projector or the projector.

8. A 3D image convertible projection optical system comprising:
    a curved surface lens arranged to be positioned in front of a projection lens of a projector;
    said curved surface lens comprising a left and right eccentric curved surface lenses having two optical axes configured to be attachable to the projection lens, said left and right eccentric curved surface lenses formed by symmetrically dividing the curved surface lens into two parts into the left eccentric curved surface lens and the right eccentric curved surface lens and exchanging the position of the left eccentric curved surface lens with the right eccentric curved surface lens for dividing the left-eye image and the right-eye image; and
    polarization plates provided in front of the left and right eccentric surface lenses.

9. The 3D image convertible projection optical system of claim 8, further comprising a projector for receiving a left-eye image and a right-eye image in one frame and configured to project the left-eye image and the right-eye image toward a projection lens.

10. The 3D image convertible projection optical system of claim 8, further comprising a prism arranged in front of the left and right eccentric curved surface lens.

11. The 3D image convertible projection optical system of claim 8, further comprising a left and right reflection mirrors arranged in front of the left and right eccentric curved surface lens.

12. The 3D image convertible projection optical system of claim 8, wherein the respective magnification rate of the left and right eccentric curved surface lens is about 1.5 to about 2.5.

13. The 3D image convertible projection optical system of claim 8, wherein the 3D image convertible projection optical system is configured to be connectable to the projection lens of the projector.

* * * * *